United States Patent [19]

Allen

[11] Patent Number: 5,316,248
[45] Date of Patent: May 31, 1994

[54] HAND ACTUATED-BUCKET POURER

[76] Inventor: Donald K. Allen, Rte. 4 Box 352, Four Oaks, N.C. 27524

[21] Appl. No.: 63,546

[22] Filed: May 19, 1993

Related U.S. Application Data

[63] Continuation-in-part of Ser. No. 930,282, Aug. 17, 1992, abandoned.

[51] Int. Cl.[5] ............. A47F 5/12; A47F 7/28
[52] U.S. Cl. ................... 248/129; 248/137; 248/141
[58] Field of Search ........... 248/129, 137, 139, 140, 248/141, 142

[56] References Cited

U.S. PATENT DOCUMENTS

| | | | |
|---|---|---|---|
| 978,562 | 12/1910 | Choate | 248/141 |
| 1,111,796 | 9/1914 | Hoffman | 248/141 X |
| 2,937,836 | 5/1960 | Fleischman | 248/141 |
| 3,236,483 | 2/1966 | House | 248/140 |

FOREIGN PATENT DOCUMENTS

| | | | |
|---|---|---|---|
| 2402771 | 7/1975 | Fed. Rep. of Germany | 248/137 |
| 2018216 | 10/1979 | United Kingdom | 248/142 |

OTHER PUBLICATIONS

"Carboy-Stand"; *Universal Engineer;* p. 107; May 19, 1888.

*Primary Examiner*—Richard K. Seidel
*Assistant Examiner*—Raymond D. Woods
*Attorney, Agent, or Firm*—Rhodes, Coats & Bennett

[57] ABSTRACT

A bucket pourer comprises a base structure and an upright support structure extending upwardly from the base. Pivotally mounted within the upright support structure is a bucket holder. A handle extends from the bucket holder, and by manipulating the handle, the bucket can be moved from an upright holding position to a tilted pouring position.

6 Claims, 4 Drawing Sheets

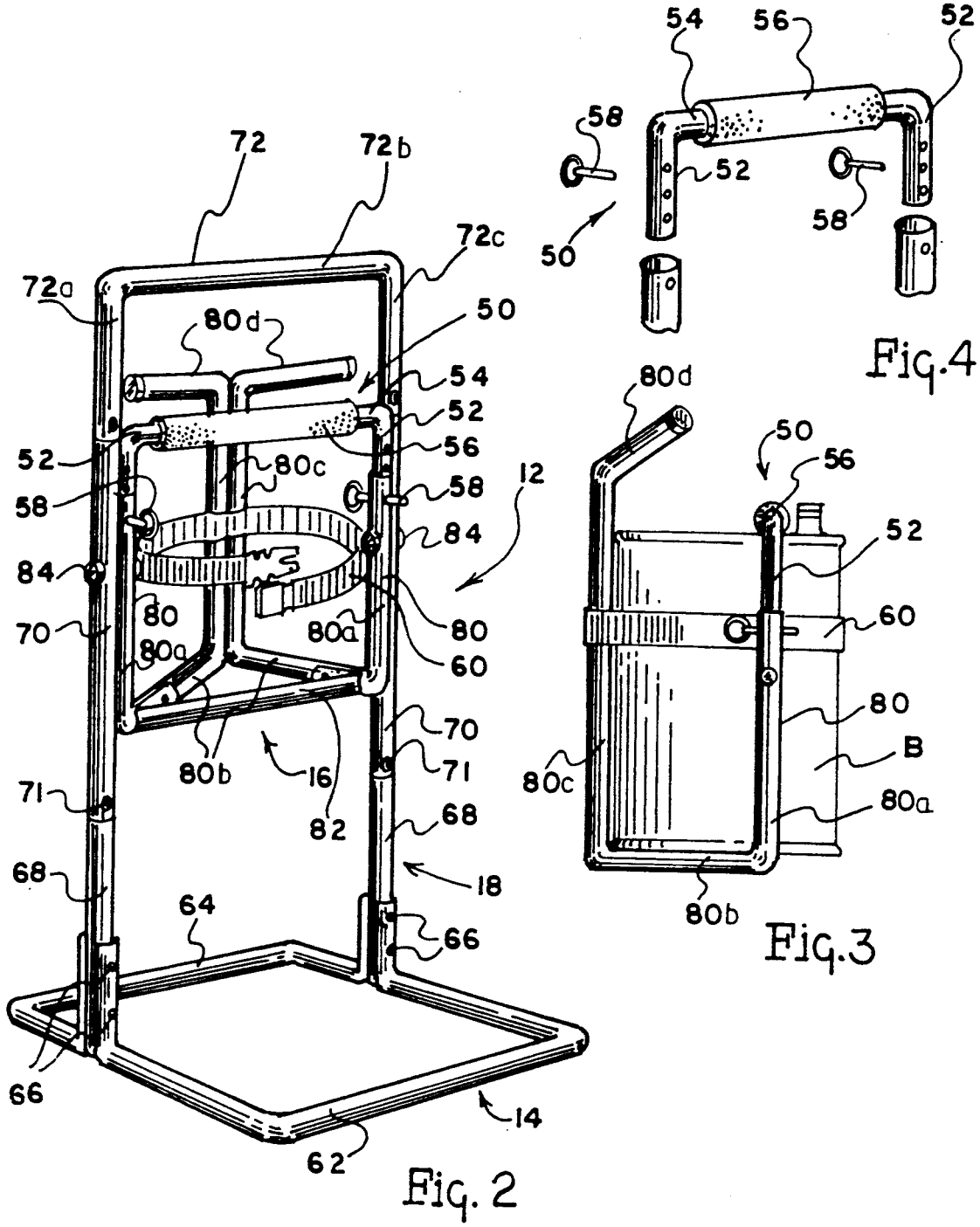

HAND ACTUATED-BUCKET POURER

This is a continuation-in-part of U.S. patent application Ser. No. 07/930,282, filed Aug. 17, 1992, now abandoned and entitled "HAND-ACTUATED BUCKET POURER".

FIELD OF THE INVENTION

The present invention relates to pouring devices and more particularly to hand-actuated pouring devices that are adapted to receive a bucket or container and wherein the container is moved from an upright non-pouring position to a tilted pouring position.

BACKGROUND OF THE INVENTION

Paint stores, body shops and the like are very familiar with the difficulties involved in pouring a liquid, such as paint, from a five-gallon bucket. First of all, these buckets filled with paint or the like are heavy and very difficult to handle. It is as especially hard to pour a small or precise amount of liquid from the bucket, and of course, spills are commonplace.

There are devices in the prior art for holding a paint bucket or the like which are capable of tilting the paint bucket to a pouring position. However, many of these devices in the prior art are heavy and difficult to handle, not to mention the fact that they are also often bulky and are not susceptible to being broken down and easily packed for convenient shipment. Also, the designs of typical prior art devices are complicated and make for manufacturing problems which, in the end, drive the cost of these devices up and make them non-affordable for the small businessman.

Therefore, there is a need for a bucket holding and pouring device that is simple in construction, easy to manufacture, assemble and ship, and which is of a light-weight construction and which can be easily used.

SUMMARY AND OBJECTS OF THE INVENTION

The present invention entails a hand-actuated bucket or container holder that is adapted to receive and hold a container such as a five-gallon bucket and to move the bucket or container from an upright support position to a tilted-pouring position. Structurally, the hand-actuated bucket pouring device of the present invention entails a base support structure having an upright structure secured thereto. Pivotally mounted to the upright support structure is a pivotally mounted bucket holder. The bucket holder is designed to receive and hold a bucket or container or the like. A handle extends from the bucket holder and permits the bucket holder to be pivoted from an upright holding position to an inclined pouring position.

It is therefore an object of the present invention to provide a simply hand-actuated bucket pouring device that is simple in construction, easy to use, and easy to install.

A further object of the present invention resides in a hand-actuated bucket pouring device that can be easily assembled and disassembled for convenient packaging and shipping.

Still a further object of the present invention resides in the provision of a hand-actuated bucket pouring device that is of a light-weight, but durable construction.

It is also an object of the present invention to provide a hand-actuated bucket pouring device that is adaptable for many different uses.

Still a further object of the present invention resides in the provision of a hand-actuated bucket pouring device that enables an individual to precisely and accurately pour small or measured quantities.

Other objects and advantages of the present invention will become apparent and obvious from a study of the following description and the accompanying drawings which are merely illustrative of such invention.

BRIEF DESCRIPTION OF THE DRAWINGS

FIG. 2 is a perspective view of the second species of the same invention.

FIG. 3 is a side elevational view of a portion of the second species shown in FIG. 2 particularly illustrating the holding and support of a bucket.

FIG. 4 is a perspective view illustrating the top retaining clamp structure that forms a part of both species of the present invention.

DETAILED DESCRIPTION OF THE INVENTION

Figure 1:
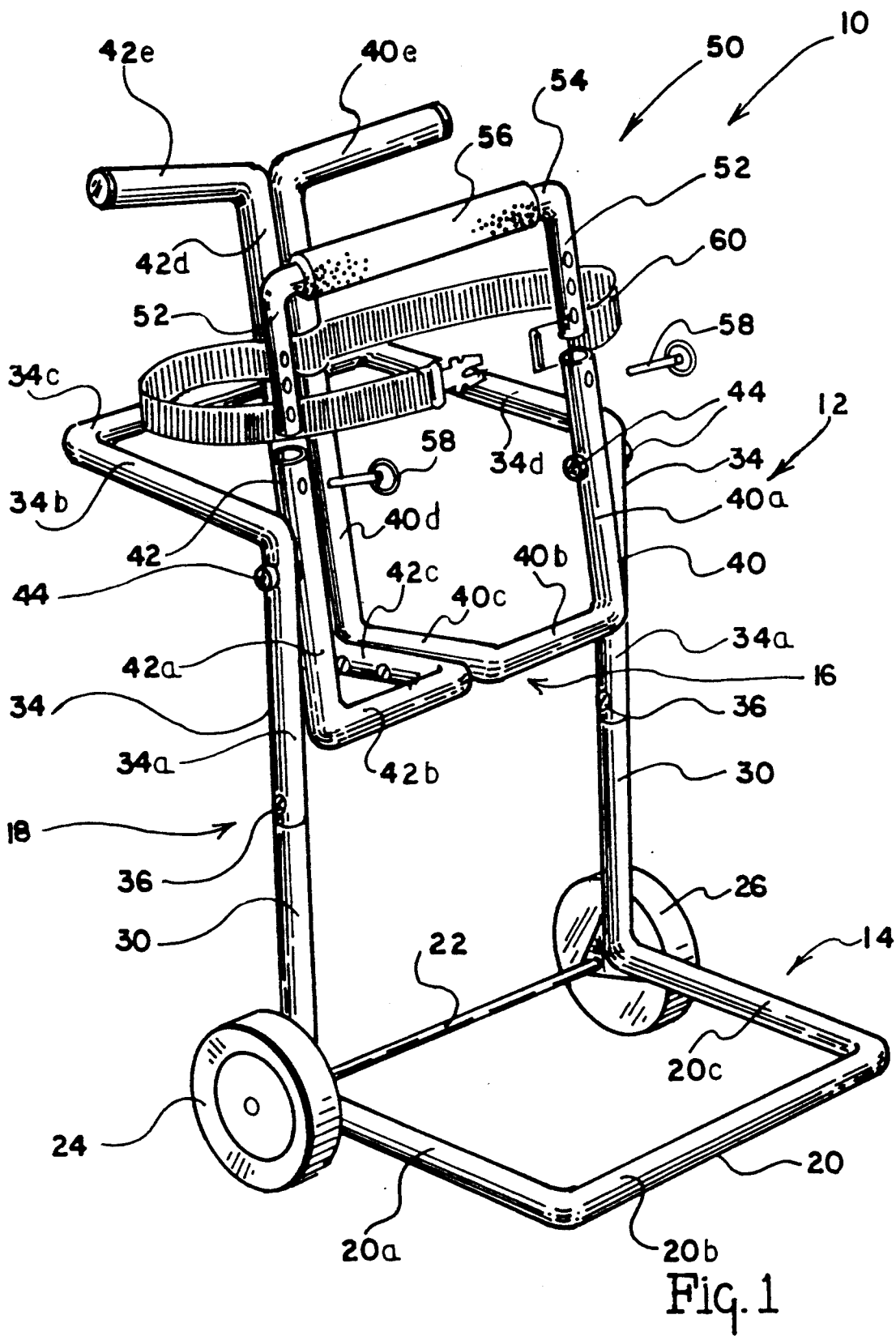
FIG. 1 is a perspective view of one species of the hand-actuated bucket pouring device of the present invention.

With further reference to the drawings, the pouring device of the present invention is indicated generally therein by the numeral 10. As will be appreciated from subsequent portions of this disclosure, the bucket pouring device 10 of the present is disclosed in the form of two species or two embodiments as shown in FIGS. 1 and 2. In any event, the basic structure of the bucket pouring device 10 comprises a main frame structure 12 having a base 14 and an upright frame structure 18. Secured within the upright frame structure is a bucket holding and support structure indicated generally by the numeral 16. As is apparent from the drawings, both species, shown in FIGS. 1 and 2, include the above structure.

First, turning to the species shown in FIG. 1, it is seen that the base 14 includes a generally u-shape base 20. Base 20 is a single member comprised of integral sections 20a, 20b, and 20c. An axle 22 extends between sections 20a and 20c and includes a pair of wheels 24 and 26 rotatably mounted thereon.

Now turning to the upright frame structure 18, it is seen that the same includes a pair of lower sections 30. As seen in FIG. 1, lower sections 30 are integral with the base 14, but it is appreciated that the lower sections 30 could be separate and independent members. Secured to the lower sections 30 via pins 36 is an upper section 34. Upper section 34 includes a pair of laterally spaced upright vertical sections 34a. A cart-type handle structure is integrally formed with the vertical sections 34a and includes a generally u-shaped structure that includes sections 34b, 34c, and 34d.

Turning to the bucket holding and support structure 16, it is seen that the species in FIG. 1 includes a pair of swing arms 40 and 42 with each swing arm being pivotally mounted to the upper sections 34a of the upright frame structure via pivot pins 44. Swing arms 40 and 42 include a pair of vertical swing-arm sections 40a and 42a. Extending inwardly from the vertical sections 40a and 42a is a pair of forward horizontal sections 40b and 42b. Integral with the forward horizontal sections 40b and 42b is a pair of rear extending horizontal sections 40c and 42c. Integral with sections 40c and 42c is a pair of vertical members 40d and 42d. Extending outwardly from members 40d and 42d is a pair of handles 42e and 40e. Thus, it is appreciated that the respective sections 40a, 42a, 40b, 42b, 40c, 42c, 40d, and 42d form a bucket receiving and holding area. It is appreciated that a bucket B (FIG. 3), such as a five gallon bucket, can fit snugly within the confines of the structure forming the bucket holding and support structure just described.

To retain the bucket about the top thereof, there is provided a clamping structure indicated generally by the numeral 50. Clamping structure 50 includes a pair of insert arms 52 connected by cross-member 54 that includes a padded surrounding 56. Insert arms 52 include a series of adjustment openings that allow the clamping structure 50 to be adjustably secured across the top of the container or bucket. By utilizing a pair of securing pins 58, it is appreciated that the clamping structure 50 can be appropriately adjusted down onto the top of a bucket held within the bucket holding and support structure 16.

To assure positive retention of the bucket within the bucket holding and support structure 16, there is provided a belt 60 that is secured about one or both sections 40d or 42d.

With respect to this first species shown in FIG. 1 and described above, it is appreciated that the entire frame structure can be moved from one location to another. In addition, the bucket pouring device 10 is designed such that a five gallon bucket or the like can be held and supported within the bucket holding and support structure. When it is desired to pour fluid from the bucket, the handle 40e and 42e can be grasped and pulled forward causing the entire bucket and support structure 16 to rotate about the pivot pins 44.

Turning to the second species shown in FIG. 2 and FIG. 3, it is seen that the base structure includes a pair of U-shaped members 62 and 64 with the U-shaped members being connected to a pair of lower sections 68 through a series of connecting pins 66. Lower sections 68, which forms a part of the upright frame structure 18, are connected to a pair of intermediate sections 70 by a pair of pins 71. Also forming a part of the upright frame structure 18 is a top section 72 that includes a series of three sections 72a, 72b and 72c all of which are integrally formed to form a U-shaped structure.

Turning now to the bucket holding and support structure 16 of the second species, it is seen that the same includes a pair of swing arms 80. Swing arms 80, through a series of integral or attached sections, forms the bucket holding and support structure 16. More particularly, swing arms 80 include a pair of vertical sections 80a which include a lower turn from which extends a pair of angled-horizontal sections 80b.

Extending upwardly from the angled-horizontal sections 80b is a pair of back-vertical sections 80c which extend upwardly to where each section turns outwardly to form a pair of outwardly extending handles 80d. The bucket holding and support structure 16 further includes a front horizontal section 82 secured between the angled-horizontal section 80b. The entire bucket holding and support structure 16 is pivotally mounted to the intermediate section of 70 via a pair of pivot pins 84.

The species or embodiment of FIG. 2 includes the same clamping structure 50 described in conjunction with the species of FIG. 1. For that reason, a detailed discussion of the clamping structure 50 will not be dealt herewith in detail. Likewise, the species of FIG. 2 also includes a retaining belt 60 of the same basic design and which forms the same function as already discussed in conjunction with the species of FIG. 1.

Note in FIG. 3 that a five gallon bucket B is held and retained within the bucket holding and support structure 16. It is appreciated that the clamping structure 50 fits down tightly on the top of the bucket B while the belt 60 wraps completely around the bucket B and retains the same within the bucket holding and support structure 16. By actuating the handles 80d, one can tilt the bucket holding and support structure 16 to an angle where fluid can be poured directly out of the bucket B.

Figure 5:
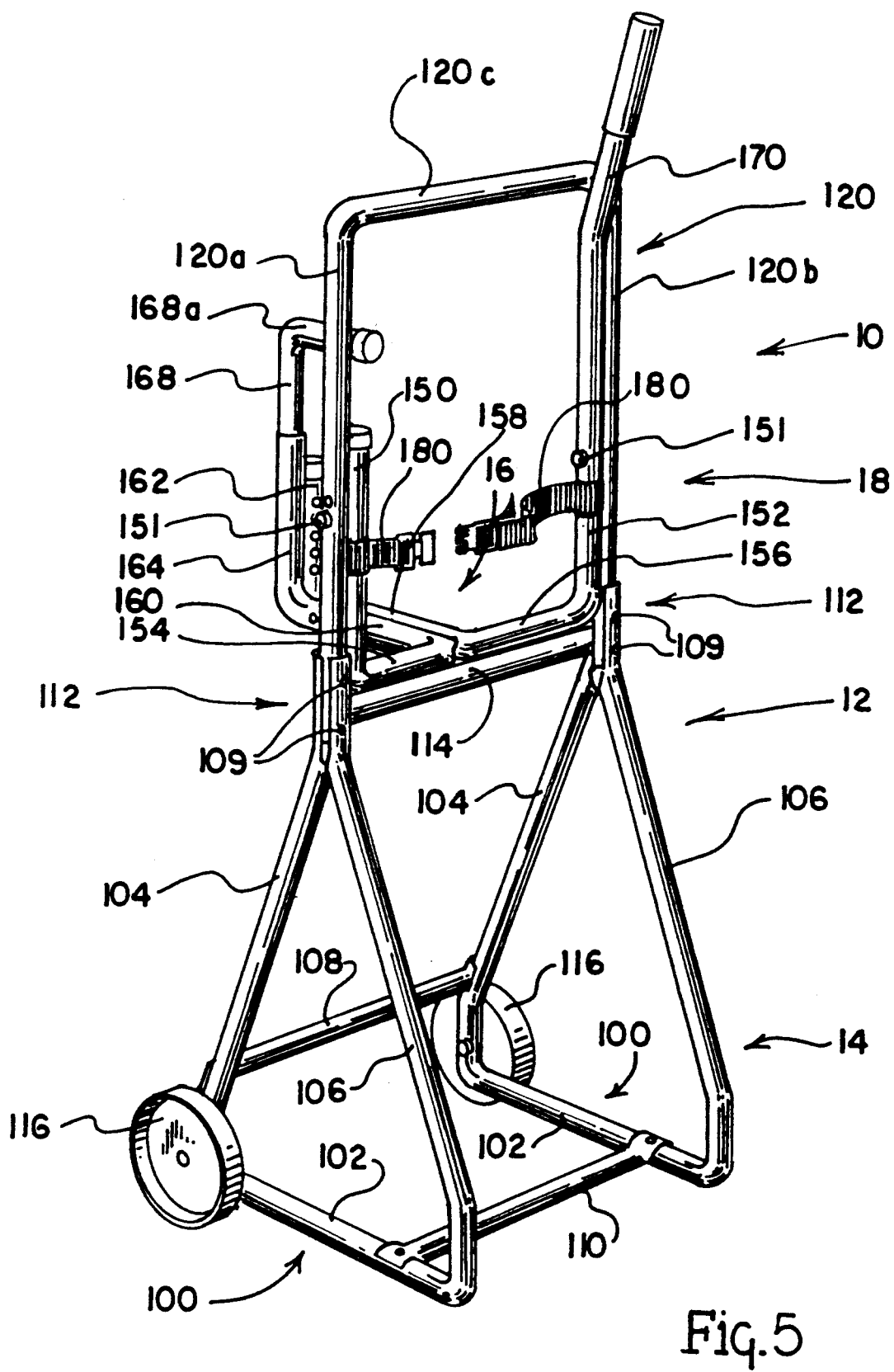
FIG. 5 is a perspective view of a third species of the bucket pourer of the present invention.
Figure 6:
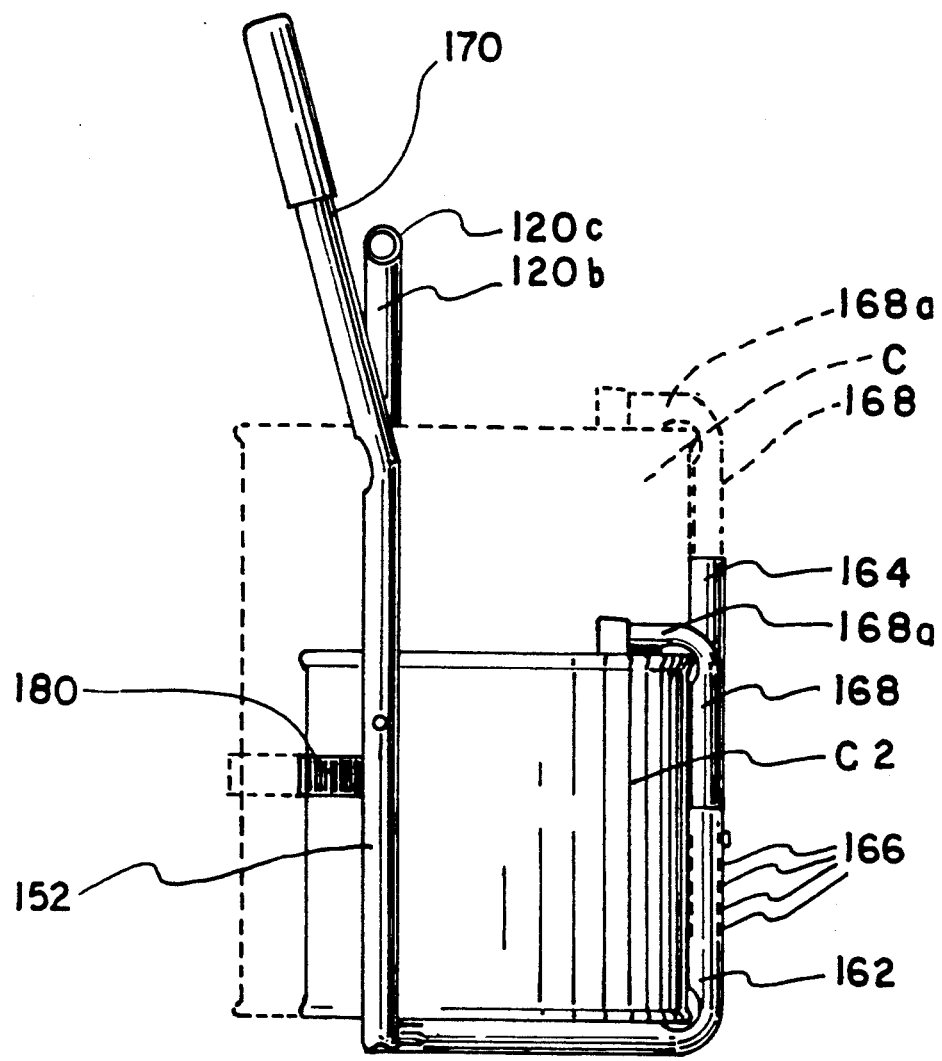
FIG. 6 is a fragmentary perspective view of a portion of the bucket holding and support structure of the present invention.

Now, turning to FIGS. 5 and 6, there is shown therein a third design or third species of the present invention. This third species comprises a bucket pouring device indicated generally by the numeral 10 and as was the case with the first two species, includes a mainframe structure indicated generally by the numeral 12, a base structure indicated generally by the numeral 14, an upright frame secured to the base and extending upwardly therefrom indicated generally by the numeral 18, and a bucket holding and support structure, indicated generally by the numeral 16.

Now, first viewing the base 14 of the third species, it is seen that the same includes a pair of laterally spaced bent pipe side frames with each side frame indicated generally by the numeral 100. It is appreciated that each bent pipe side frame 100 comprises a single elongated pipe that has been particularly bent and crimped to conform to the shape shown in the drawings. Viewing each side frame 100 it is seen that the same includes a bottom run 102 and extending upwardly from opposite ends of the bottom run 102 is a pair of upper runs 104 and 106. Upper runs 104 and 106 converge towards each other about the top of the side frame 100 and form a pipe receiver 112 where the upper portions of the upper runs 104 and 106 converge.

Connected between the two side frames 100 is a rear cross-member 108 and a lower front cross-member 110. Secured about the lower rear portions of the assembled and connected side frames 100 is a pair of wheels 116. Finally, connected between the upper ends of the upper runs 104 and 106 of each side frame 100 is an upper cross-member 114. Thus, it is appreciated that the base structure 14 of the third species as shown in FIG. 5 is of an open rigid frame structure.

Now, turning to the upright frame structure 18, it is seen that the same basically includes an inverted U-shaped frame indicated generally by the numeral 120. The lower ends of the inverted U-shaped frame 120 are adapted to extend into the defined receivers 112 that are defined about the upper portion of each side frame 100 by the upper ends of the upper runs 104 and 106. In particular, the receiver 112 for each side frame 100 is formed by particularly shaping the upper remote end of each run 104 and 106 into a half cylinder. A pair of bolts 109 extend through the respective pairs of half cylinder and through the lower end portions of the inverted U-shaped frame so as to form a unitary structure between the base 14 and the upright frame structure 18. As seen in the drawings, the inverted U-shaped frame 120 comprises a pair of upstanding legs 120a and 120b joined together by a horizontal cross-member 120c. As with the base 14, this upright frame structure 18, just described, is fabricated from a pipe structure with the respective components being bent and shaped so as to form the structure shown in the drawings.

Now, turning to the bucket holding and support structure indicated generally by the numeral 16, it is appreciated that in the case of the third species this bucket holding and support structure is pivotally connected and supported within the inverted U-shaped frame structure 120. With respect to the third species design, the bucket support structure 16 includes a pair of swing arms 150 and 152 that are each pivotally connected by a pivot pin 151 to a respective leg 120a or 120b of the inverted U-shaped frame structure. As with the other frame components of this bucket pouring device shown in FIG. 5, the bucket holding and support structure 16 is of a pipe design. Therefore, the swing arms 150 and 152 are bent such that extending inwardly from each swing arm there is a pair of transverse base runs 154 and 156. The base runs 154 and 156 are in turn bent to form a pair of rear extending base runs 158 and 160. It is seen that these base runs 154, 156, 158 and 160 form the bottom of the bucket support structure and effectively engage and support the bucket from the bottom.

To retain the bucket about the base runs 154, 156, 158 and 160, the respective rear base runs 158 and 160 are bent to form two upstanding pipe posts 162 and 164. Note that post 162 is shorter than post 164. As will be appreciated from subsequent portions of this disclosure, the provision of the short back post 162 and the long back post 164 gives the design of the third species the capacity to hold and retain buckets of substantially different heights and sizes. But continuing to refer to the back posts 162 and 164, it is seen that each post includes a series of openings 166.

There is provided a single clamping bar 168 that is designed to be inserted into a top opening formed in both the short back post 162 or the long back post 164. As seen in the drawings, the clamping bar 168 is adapted to fit down into the top opening formed in each back post 162 and 164 and to project upwardly therefrom where the clamping bar 168 includes a top bent portion 168a that extends over the top of the bucket held and supported within the bucket holding and support structure 16. A push-button type retainer (FIG. 6) is mounted in the lower portion of the clamping bar 168 and is biased to an outwardly projected position. This spring biased button or pin is designed to project from the base of the clamping bar 168 and to project therefrom through a respective opening 166 formed in either of the back posts 162 or 164.

Therefore, it is appreciated that the clamping bar 168 can be conveniently moved from the short back post 162 to the long back post 164. This permits the clamping bar to be effective to engage and retain the top portion of various size containers.

For example, the clamping bar 168 can retain either a five-gallon container C or a conventional C2 two and one-half gallon container. Because of the dual post 162 and 164 and the spaced apart opening 166 provided therein, it is appreciated that containers of various heights can be accommodated by the bucket pouring device of the present invention.

Therefore, it is appreciated that the clamping bar 168 can be conveniently moved from one back post 162 to the other back post 164. This permits the clamping bar to be effective to engage and retain the top portion of various size containers, for example, the clamping bar 168 can retain either a five-gallon container or a conventional two and one-half gallon container. Because of the dual post 162 and 164 and the spaced apart openings 166 provided therein, it is appreciated that containers of various heights can be accommodated by the bucket pouring device of the present invention.

To actuate and pivot the bucket holding and support structure 16 from its upright position to an inclined pouring position, there is provided a handle extension 170 that is integral with a respective swing arm 150 or 152. As seen in the drawings, the handle 170 extends upwardly from a respective swing arm and is slightly bent and angled so as to clear and extend upwardly past the top cross-member 120c of the invert U-shaped frame 120.

To secure a bucket within the bucket holding and support structure 16 of the third species just described, a strap 180 is provided and is attached to a respective swing arm 150 or 152 and is designed to extend around the bucket and to secure the same within the defined bucket holding and support structure just described.

For the foregoing reasons, it is appreciated that the present invention entails a very effective and efficient bucket pouring device that positively holds and retains the bucket B while at the same time provides an easy means for conveniently pouring fluid such as paint, water or the like from the bucket B.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A hand-actuated mobile bucket pouring device comprising:
   a) a base support structure for sitting on the ground or other support surface;
   b) the base support structure including a pair of laterally spaced side frames with each side frame having a lower run and a pair of upwardly converging runs having upper ends that converge and are secured together to form a converging junction such that each side frame forms a closed frame structure that consists essentially of the lower run and the two upwardly converging runs;
   c) a series of cross-members connected between the side frames and including a lower cross-member connected between the lower runs and an upper cross-member connected between the converging junctions of the upwardly converging runs of the side frames;
   d) an upright member secured to each converging junction of each side frame and extending upwardly therefrom;
   e) a bucket support structure pivotally mounted between the upright members that extends upwardly from the converging junctions of the side frames;
   f) the bucket support structure including a pair of laterally spaced side arms, each side arm pivotally mounted to one of the upright members, and a T-shaped open frame bottom support structure secured between the laterally spaced side arms and including a cross-member extending between lower portions of the side arms and a bottom member extending generally perpendicularly from a mid point area of the cross-member a selected distance, and a back post connected to an end of the bottom member and extending generally perpendicularly upwardly therefrom to form a back portion of the bucket support structure, wherein the side arms, the T-shaped bottom support structure and the back post form the bucket support structure held between the upright members;

g) a retainer extending from an upper portion of the back post generally perpendicularly to the back post for engaging the top of a bucket and retaining the bucket on the bucket support structure; and h) a handle secured to the bucket support structure and extending therefrom for pivoting the bucket support structure from an upright position to a tilted pouring position.

2. The hand-actuated mobile bucket pouring device of claim 1 wherein the base support structure includes wheel means mounted thereto that permit the bucket pouring device to be moved from one location to another.

3. The hand-actuated mobile bucket pouring device of claim 1 wherein the handle is integral with one side arm and extends upwardly from the one side arm.

4. The hand-actuated mobile bucket pouring device of claim 1 wherein the back post includes a relatively short post and a relatively long post and wherein the retainer for engaging the top of the bucket includes means for detachably connecting the retainer to either the relatively short post or the relatively long post so as to form an interchangable retainer.

5. The hand-actuated bucket pouring device of claim 4 wherein each of the relatively short and long posts includes a series of spaced apart openings formed therein and wherein the interchangeable retainer includes a spring loaded pin for projecting from the retainer through a selected opening in either post so as to properly secure the retainer such that the retainer engages and clamps the top of a bucket held within the bucket support structure.

6. The hand-actuated bucket pouring device of claim 1 wherein the upper ends of the upwardly converging runs of each side frame are formed into half cylinders which are disposed adjacent to each other to form an open sleeve-type receiver; and wherein each upright member includes a lower terminal end that fits into the respective open sleeve-type receiver.

* * * * *